United States Patent [19]

Skokan

[11] Patent Number: 5,412,783
[45] Date of Patent: May 2, 1995

[54] METHOD FOR EFFICIENT SERIALIZED TRANSMISSION OF HANDSHAKE SIGNAL ON A DIGITAL BUS

[75] Inventor: Zdenek E. Skokan, Redwood City, Calif.

[73] Assignee: Hewlett-Packard Company, Palo Alto, Calif.

[21] Appl. No.: 87,148

[22] Filed: Jul. 2, 1993

Related U.S. Application Data

[63] Continuation of Ser. No. 786,461, Nov. 10, 1991, abandoned.

[51] Int. Cl.$^6$ ............................................. G06F 13/42
[52] U.S. Cl. .............................. 395/325; 364/DIG. 1; 364/229; 364/229.2; 364/240; 364/242.94; 364/265.2; 364/DIG. 2; 364/940.61; 364/940.62; 364/940.81; 364/942.03; 395/200
[58] Field of Search .................. 395/200, 325, 275; 370/85.11, 85.1

[56] References Cited

U.S. PATENT DOCUMENTS

| | | | |
|---|---|---|---|
| Re. 32,858 | 2/1989 | Blahut et al. | 395/550 |
| 4,150,438 | 4/1979 | Dorey et al. | 395/325 |
| 4,528,626 | 7/1985 | Dean et al. | 395/275 |
| 4,562,533 | 12/1985 | Hodel et al. | 395/200 |
| 4,570,220 | 2/1986 | Tetrick et al. | 395/325 |
| 4,621,360 | 11/1986 | Inoue | 370/85.11 |
| 4,746,918 | 5/1988 | Dijkers et al. | 340/825.06 |
| 4,831,358 | 5/1989 | Ferrio et al. | 370/85.1 |
| 4,864,291 | 9/1989 | Korpi | 395/325 |
| 4,959,833 | 9/1990 | Mercola et al. | 371/32 |
| 5,029,124 | 7/1991 | Leahy et al. | 395/325 |
| 5,068,785 | 11/1991 | Sugiyama | 395/325 |
| 5,079,696 | 1/1992 | Priem et al. | 395/500 |
| 5,206,946 | 4/1993 | Brunk | 395/500 |
| 5,218,682 | 6/1993 | Frantz | 395/325 |
| 5,276,807 | 1/1994 | Kodoma et al. | 395/200 |

*Primary Examiner*—Jack B. Harvey
*Assistant Examiner*—Ayaz R. Sheikh

[57] ABSTRACT

An asynchronous handshake signal is encoded in order to facilitate the transfer of the asynchronous handshake signal from a first network segment to a second network segment. On the first network segment, control signals and data signals are encoded as control symbols and data symbols, respectively. The control symbols and the data symbols are transferred from the first network segment to the second network segment across an interconnection medium. In order to send a handshake signal from the first network segment to the second network segment, the handshake signal on the first network segment is sampled. When the handshake signal on the first network segment is at a first signal level, a control symbol of encoded control signals is sent across the interconnection medium. When the handshake signal on the first network segment is at a second signal level, a data symbol of encoded data signals is sent across the interconnection medium.

20 Claims, 5 Drawing Sheets

METHOD FOR EFFICIENT SERIALIZED TRANSMISSION OF HANDSHAKE SIGNAL ON A DIGITAL BUS

This application is a continuation of application Ser. No. 07/786,461, filed Nov. 10, 1991, now abandoned.

BACKGROUND

The present invention concerns a method which allows for efficient serialized transmission of a handshake signal on a digital bus.

Wide parallel busses are often used to communicate large amounts of digital data at high speeds. Such busses have four basic groups of signal lines. These are control lines, data lines, handshake lines and timing lines. Parallel busses are usually bulky and their electrical properties usually limit the distance over which they can be built. It is impractical to operate such high speed busses over large distances due to the difficulty in matching propagation delays of multi-wire mediums and the costs and physical bulk of the cables.

One practical solution to extend the distance of a parallel bus is to convert the signals on the parallel bus into information which may be transported over a serial transmission medium using a single conductor. This is a cost effective solution which is limited primarily by the bandwidth of transmission medium and limitations of parallel to serial and serial to parallel conversion. Twisted pair wire, coaxial cable, RF and optical medium can be used to carry the signals. In the case of twisted pair wire and coaxial cable, the distance is limited by bandwidth and attenuation properties of the medium. In the case of fiber-optics, the distance is also limited by the signal to noise ratios and attenuation properties of optical to electrical interfaces. The fiber-optic medium is suitable for the longest distances due to its high frequency bandwidth and low attenuation.

Because of the above-described limitations, it is desirable to be able to send the maximum amount of information over the lowest possible bandwidth. This may be achieved by efficient coding techniques to convert the parallel bus binary data, timing and control information into a serial stream. Several layers of coding techniques are used to achieve this goal. In order to maximize the parallel to serial bandwidth ratio, techniques such as No Return to Zero, Invert on ones (NRZI) which transmits logical ones as transitions and zeroes as absence of transitions are utilized. 4B/5B, 5B/6B, 9B/10B and other coding techniques in conjunction with NRZI facilitate transmission of data and synchronization of clocks over a single transmission medium.

SUMMARY OF THE INVENTION

In accordance with the preferred embodiment of the present invention, a method is provided for encoding an asynchronous handshake signal in order to facilitate the transfer of the asynchronous handshake signal from a first network segment to a second network segment. The method takes advantage of the fact that signals on data lines and signals on control lines of a digital bus usually transition at different times. The control signals on control lines are stable while data is transmitted and no data is transmitted while signals on control lines change. This fact enables efficient alternation of available bandwidth of serial link between data and control transmissions. Control signals and data signals on the first network segment are encoded as control symbols and data symbols, respectively. The control symbols and the data symbols are transferred from the first network segment to the second network segment across a serial interconnection medium.

In order to send a handshake signal from the first network segment to the second network segment, the handshake signal on the first network segment is sampled. When the handshake signal on the first network segment is at a first signal level, a control symbol of encoded control signals is sent across the interconnection medium. When the handshake signal on the first network segment is at a second signal level, a data symbol of encoded data signals is sent across the interconnection medium.

When receiving the control symbols and the data symbols from across the interconnection medium, a handshake signal on the second network segment is held at the first signal level when a symbol of encoded control signals is being received and is held at the second signal level when a data symbol of encoded data signals is being received.

In order to increase bandwidth efficiency and to facilitate synchronization of system clocks on the first network segment and the second network segment, symbols are sent across the interconnection medium at a fixed rate. At the maximum handshake rate, one data symbol is alternated with one control symbol across the interconnection medium. At any lower rate of data transfer, redundant control symbols are sent when the handshake signal is at the first signal level and redundant data symbols are sent when the handshake signal is at the second signal level.

The present invention introduces an additional level of encoding which allows transmission of a handshake signal across an interconnection medium between two network segments. The method takes advantage of the multiplexing code capability of some commercial serializer semiconductor chips which distinguish between data and control symbols. The alternation between data and control symbols allows reconstruction of handshake signals with a relative timing accuracy of one symbol transmission time. The method also allows for a very effective utilization of link bandwidth since during the times when no data is being transmitted, the entire bandwidth across the interconnection medium is available to send control symbols. During a data transmission, control symbols may be sent across the interconnection medium at the same rate as data symbols. Further utilization of the limited bandwidth across the interconnection medium may be accomplished by adding a level of coding for compression of control signals and data signals within the control symbols and data symbols, respectively.

DESCRIPTION OF THE PREFERRED EMBODIMENT

Figure 1:
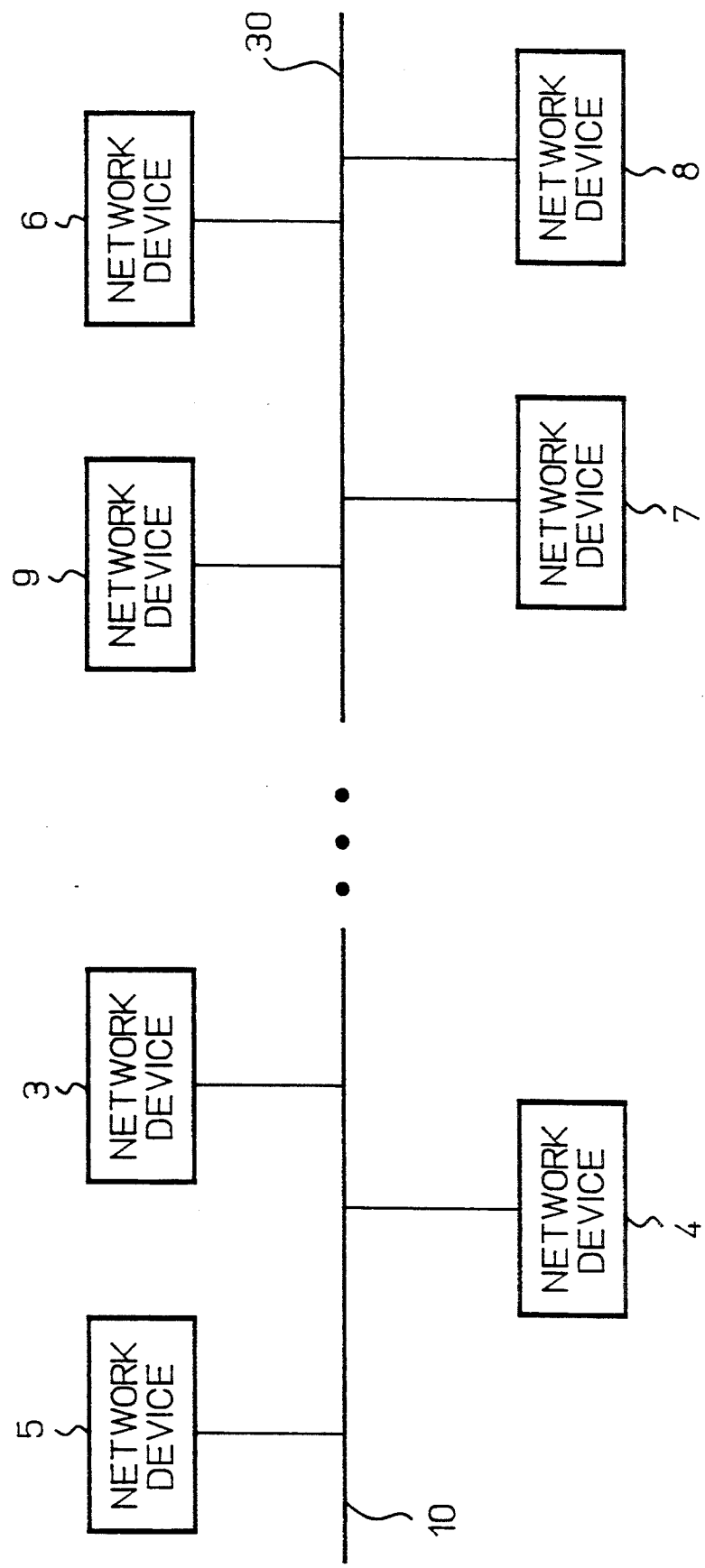
FIG. 1 is a functional block diagram of a two ends of a network separated by an extended distance in accordance with the preferred embodiment of the present invention.

FIG. 1 is a conceptual block diagram which shows a network device 3, a network device 4 and a network device 5 connected to a network bus segment 10 and shows a network device 6, a network device 7, a network device 8 and a network device 9 connected to a network bus segment 30. Network bus segment 30 and network bus segment 10 are separated over an extended distance. For example, the network bus may operate in accordance with the SCSI protocol. For more information on the SCSI protocol, see the American National Standard for SCSI-2, available as Document X3.131-199X from Global Engineering Documents, 2805 McGaw, Irvine, Calif. 92714. For the purposes herein, a SCSI bus is a bus system which conforms with the SCSI-2 protocol defined by this standard.

Figure 2:
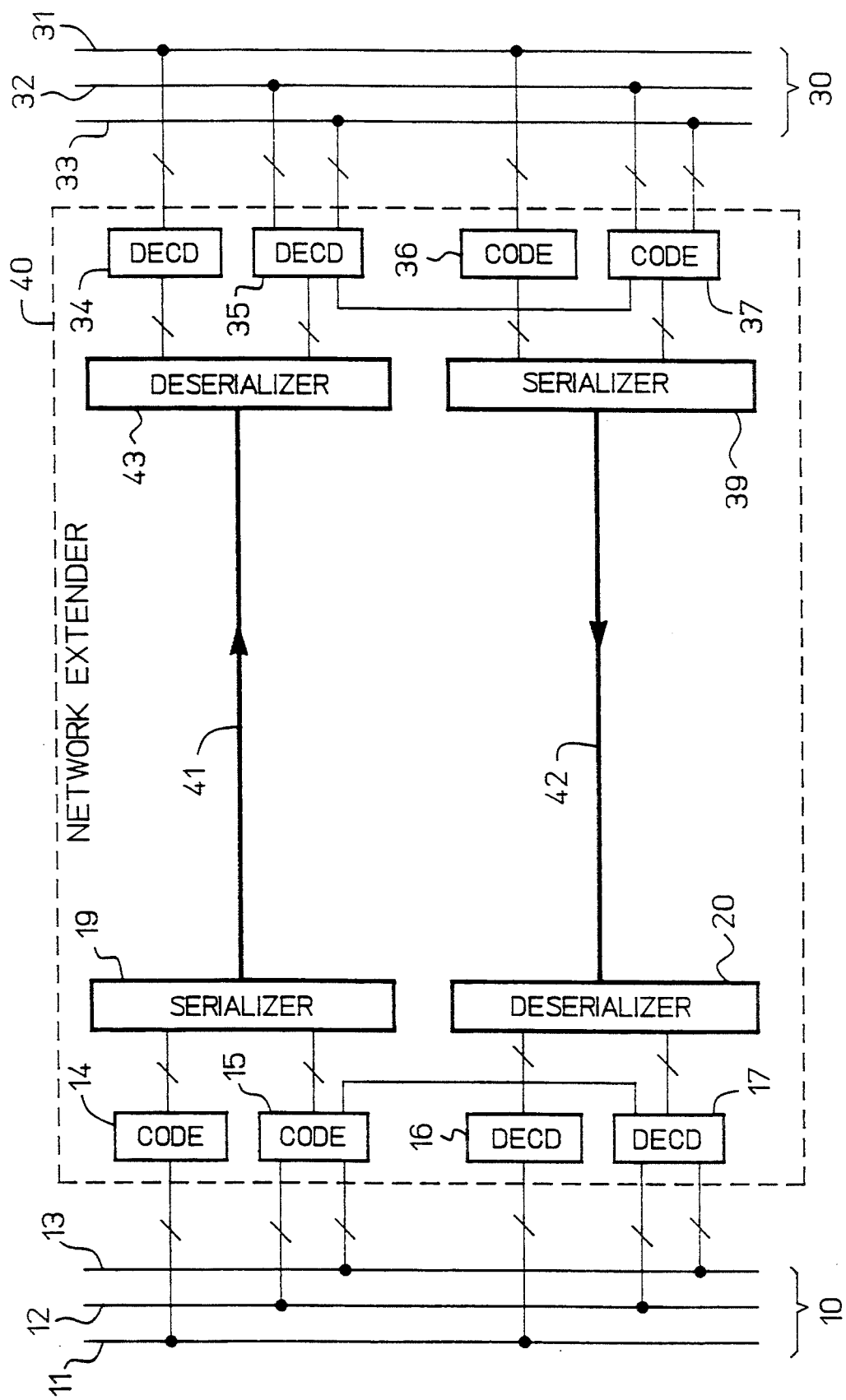
FIG. 2 shows a block diagram of a network architecture which provides for connection of two segments of a bus by a long interconnection medium in accordance with a preferred embodiment of the present invention.

FIG. 2 shows a block diagram of a network extender 40 which connects network bus segment 10 to network bus segment 30 over the extended distance. Network bus segment 10 includes data lines 11 which transmit bits, nibbles, bytes or multi-byte words of digital data. In the preferred embodiment, transfer of data on data lines 11 is timed using timing signals 12. In the preferred embodiment, timing signals 12 include handshake signals used for asynchronous transfers and includes a system clock used for synchronous transfers. Network bus segment 10 also has control lines 13 which, for example, define the type of data, the direction of data transfer, the source of data and the destination of data. Usually the rule is that data lines 11 are active while control lines 13 are stable and vice versa. Generally, timing lines, whether handshake lines or system clock lines, have the highest bandwidth and therefore require the most accurate timing.

Similarly, network bus segment 30 has data lines 31 which transmit bits, nibbles, bytes or multi-byte words of digital data. In the preferred embodiment, transfer of data on data lines 31 is timed using timing signals 32. In the preferred embodiment, timing signals 32 include handshake signals used for asynchronous transfers and includes a system clock used for synchronous transfers. Network bus segment 30 also has control lines 33 which, for example, define the type of data, the direction of data transfer, the source of data and the destination of data. As a general operating principle for such networks, data lines 31 are active while control lines 33 are stable and vice versa.

Sampled values on data lines 11 are encoded by a coder 14. Sampled values on timing lines 12 and control lines 13 are encoded by a coder 15. The encoded values are then sent by a serializer 19 through a long interconnection medium 41, to a deserializer 43. The encoded values received by deserializer 43 are decoded by a decoder 34 and a decoder 35 before being placed respectively on data lines 31, timing lines 32 and control lines 33.

Sampled values on data lines 31 are encoded by a coder 36. Sampled values on timing lines 32 and control lines 33 are encoded by a coder 37. The encoded values are then sent by a serializer 39 through a long interconnection medium 42, to a deserializer 20. The encoded values received by deserializer 20 are decoded by a decoder 16 and a decoder 17 before being placed respectively on data lines 11, timing lines 12 and control lines 13.

Bus extenders which sample values on one segment of a bus and serially transmit the values to another segment of the bus through a long interconnection medium are generally known in the art. See for example, the HP-IB extenders Model Numbers HP 37201 and HP 37204, available from Hewlett Packard Co. having a business address of 3000 Hanover Street, Palo Alto, Calif. 94304. Off the shelf parts have been developed which act as encoder/serializers or decoder/deserializers. See for example, model AM 7968/7969 available from Advanced Micro Devices, Inc. having a business address of 901 Thompson Place, Sunnyvale, Calif. 94086.

In the preferred embodiment of the present invention, serial transmission over long interconnection medium 41 and long interconnection medium 42 runs at a constant crystal controlled rate in order to facilitate easy clock recovery. The frequency for the system clock of either network bus segment 10 or network bus segment 30, when receiving data, may (or may not) be related to the frequency of the clock used for the serial transmission.

Figure 3:
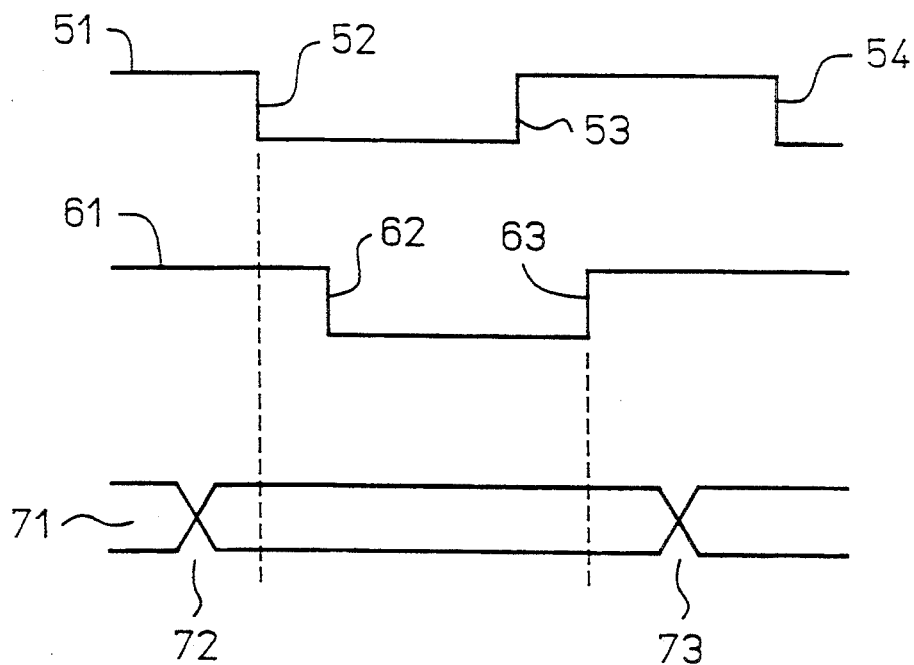
FIG. 3 and FIG. 4 show a timing diagrams for handshake signals of a SCSI bus network in the prior art.

FIG. 3 shows a description of asynchronous handshake signals for a SCSI bus. A signal form 51 represents a REQ handshake signal, which is controlled in a transaction by a Target. A signal form 61 represents an ACK handshake signal, which is controlled in a transaction by an Initiator. A signal form 71 represents timing for data signals when the Target is transferring data to the Initiator.

When the Target transfers a byte of data to the Initiator, the Target first places data on data lines 31. This is represented by a transition 72 in signal form 71. The Target then asserts the REQ handshake signal as represented by a transition 52 of signal form 51. Since a SCSI bus uses a negative true signal, when discussing a SCSI bus herein, asserting is considered the equivalent of driving a signal low.

After observing transition 52, the Initiator will assert the ACK handshake signal as represented by a transition 62 of signal form 61. The Target will then release the REQ signal as represented by transition 53. When the Initiator has received the data, the Initiator will release the ACK signal as represented by a transition 63. The Target may then begin the next transfer of data by placing new data on data lines 31. This is represented by a transition 73 in signal form 71. The Target then asserts the REQ handshake signal as represented by a transition 54 of signal form 51. And so on. As may be seen, one byte of data is transferred for each complete cycle of the REQ handshake signal and for each complete cycle of the ACK handshake signal.

Figure 4:
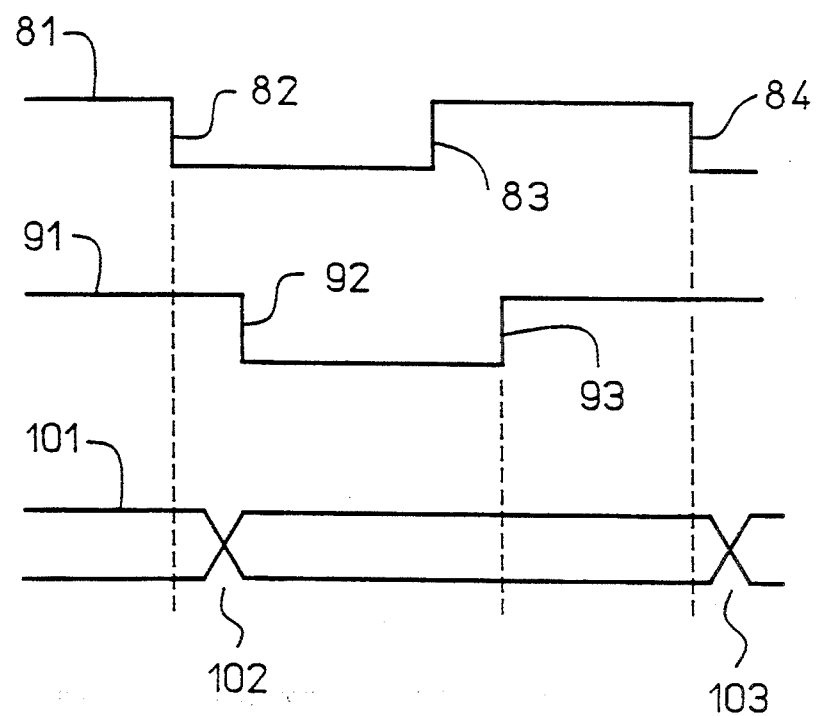

FIG. 4 shows a description of handshake signals for the case where the Initiator transfers a byte of data to the Target. A signal form 81 represents a REQ handshake signal, which is controlled in a transaction by the Target. A signal form 91 represents a ACK handshake signal, which is controlled in a transaction by the Initiator. A signal form 101 represents timing for data signals when the Initiator is transferring data to the Target.

When the Initiator transfers a byte of data to the Target, the Initiator places data on data lines 11 as represented by a transition 102 in signal form 101. The data is placed after the Target asserts the REQ handshake signal, as represented by a transition 82 of signal form 81.

After observing transition 82, the Initiator will assert the ACK handshake signal as represented by a transition 92 of signal form 91. The Target will then release the REQ signal as represented by transition 83. Then the Initiator will release the ACK signal as represented by a transition 93. When the Target has received the data, the Target then asserts the REQ handshake signal, as represented by a transition 84. The Initiator may then begin the next transfer of data by placing new data on data lines 11. This is represented by a transition 103 in signal form 101. As is seen, one byte of data is transferred for each complete cycle of the REQ handshake signal and for each complete cycle of the ACK handshake signal.

In a SCSI bus, for a data transaction between a Target and an Initiator on different bus segments connected by an extender, each of the asynchronous handshake signals must be transferred across an extender. The REQ handshake signal must be transferred from the bus segment to which the Target is connected to the bus segment to which the Initiator is connected. Similarly, the ACK handshake signal must be transferred from the bus segment to which the Initiator is connected to the bus segment to which the Target is connected. The preferred embodiment of the present invention describes a method by which asynchronous handshake signals may be encoded and sent across a serial link connecting bus segments.

Figure 5:
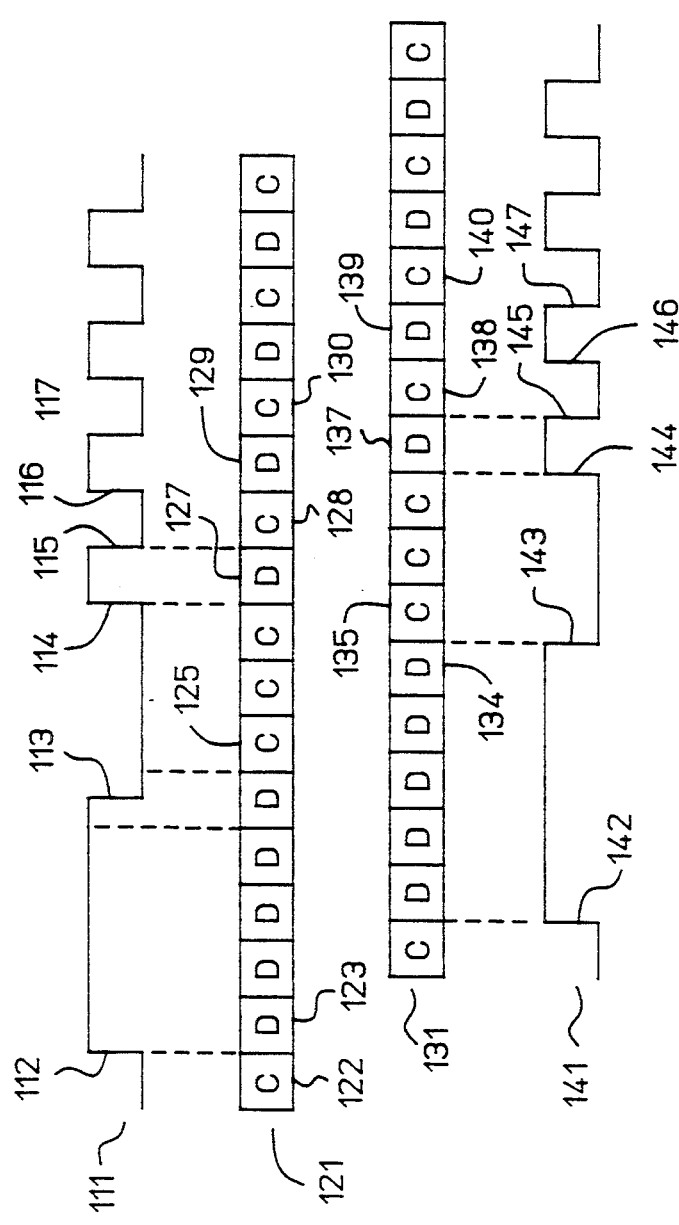
FIG. 5 illustrates a method for encoding and decoding handshake signals in a serialized signal in accordance with the preferred embodiment of the present invention.

FIG. 5 illustrates the encoding of a handshake signal, as represented by a waveform 111 for transmission across a serial link and the decoding to reproduce the handshake signal, as represented by a waveform 141. Although the following description describes the encoding and transmission of a handshake signal from bus segment 10 to bus segment 30, the same method may be used when sending a handshake signal from bus segment 30 to bus segment 10.

For example, the original handshake signal represented by waveform 111 is a handshake signal from timing signals 12. In the course of data transactions this handshake signal is encoded, serialized, transferred through long interconnection medium 41, decoded and placed on timing signals 32 of network bus segment 30. Sequence 121 represents segments of encoded data and control signals, called symbols, sent by serializer 19 across long interconnection medium 41. Each symbol labelled "C" represents sampled and encoded control signals from control lines 13. Each symbol labelled "D" represents sampled and encoded signals from data lines 11. The frequency at which symbols are sent is determined by the serial link clock rate and symbol length. Each symbol is one or more bits long. Control symbols do not necessarily have the same bit length as data symbols. It is the serial link symbol rate from which the received handshake is derived by decoder 35 for placement on timing lines 12.

At each cycle of the serial link clock, one bit of a symbol of encoded control signals "C" or one bit of a symbol of encoded "D" signals are sent. For example, when using AM 7968/7969 products available from Advanced Micro Devices, Inc., a 4B/5B and/or a 5B/6B encoding scheme may be used to encode the control signals and the data signals. Multiplexing circuitry within serializer 19 is controlled to determine whether a control signal "C" or a symbol of encoded "D" signals will be sent.

In the preferred embodiment of the present invention, the handshake signal on timing lines 12 is sampled to control the multiplexing circuitry within serializer 19. When the sampling determines the handshake signal is true, the serializer will send a data symbol (D). When the sampling determines the handshake signal is false, the serializer will send a control symbol (C).

For example, initially in FIG. 5 the handshake signal is low. Therefore, a first symbol 122 shown in FIG. 5, which is sent by serializer 19, is a control symbol. The handshake signal goes high at a transition 112; therefore, a next symbol 123 is a data symbol. While there are no transitions in the handshake signal, serializer 19 will continue to send data symbols resulting from the sampling of data lines 11. After a transition 113, the handshake signal is low, so a next symbol 125 is a control symbol. While there are no transitions in the handshake signal, serializer 19 will continue to send control symbols resulting from the sampling of control lines 13. After a transition 114, the handshake signal is high, so a next symbol 127 is a data symbol. After a transition 115, the handshake signal is low, so a next symbol 128 is a control symbol. After a transition 116, the handshake signal is high, so a next symbol 129 is a data symbol. After a transition 117, the handshake signal is low, so a next symbol 130 is a control symbol. And so on.

A sequence 131 represents symbols of encoded data and control signals received by deserializer 43 across long interconnection medium 41. Sequence 131 is the same as sequence 121, only delayed in time resulting from propagation delay across long interconnection medium 41.

Sequence 131 is decoded to produce waveform 141. A first symbol 132 is a control symbol (C), so the handshake signal represented by waveform 141 is low. A next symbol 133 is a data symbol (D) so the handshake signal goes high at a transition 142. The following symbols until and including symbol 134 are also data symbols, so no transition appears in the handshake signal. A next symbol 135 is a control symbol, resulting in a transition 143 of the handshake signal to a low state. The following symbols are control symbols until a symbol 137. Symbol 137 is a data symbol which results in a transition 144 of the handshake signal to a high state. A next symbol 138 is a control symbol, resulting in a transition 145 of the handshake signal to a low state. A next symbol 139 is a data symbol which results in a transition 146 of the handshake signal to a high state. A next symbol 140 is a control symbol, resulting in a transition 147 of the handshake signal to a low state. And so on.

This alternation of data symbols and control symbols based on the original handshake signal allows a reasonable reconstruction of the handshake signals on a receiving end. The relative timing accuracy of the reconstructed asynchronous handshake signal is proportional to the transmission time for one symbol. Using the discussed method, the maximum frequency of the asynchronous handshaking signal is one half the transmission frequency of the symbols across long interconnection medium 41.

Figure 6:
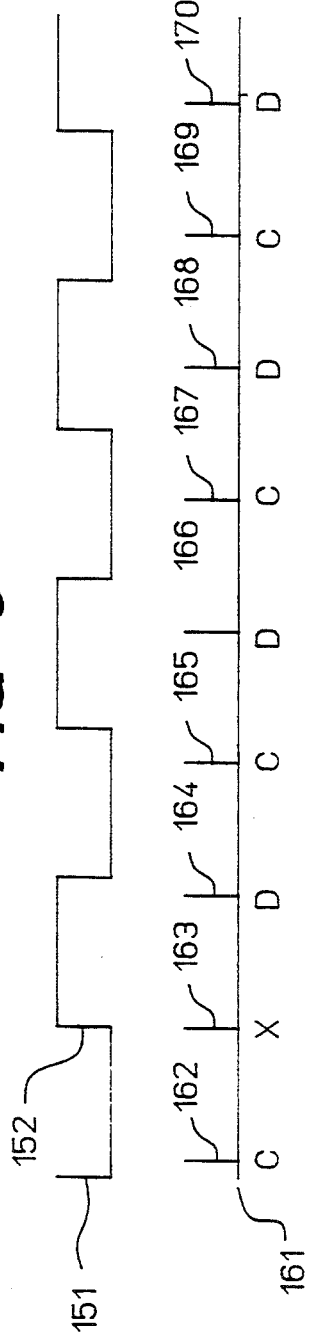
FIG. 6 illustrates the minimum sampling frequency for encoding handshake signals using the method illustrated by FIG. 5 in accordance with the preferred embodiment of the present invention.

FIG. 6 illustrates the effect of sampling frequency when sampling a handshake signal, represented by waveform 151, to determine when to transition between transmission of data symbols and control symbols. In FIG. 6, the symbol transmission period is approximately ninety percent of the handshake transition rate. A waveform 161 represents a sampling signal. At a sampling time 162 the handshake signal is low, so a control symbol is sent across long interconnection medium 41. At a sampling time 164 the handshake signal is high, so a data symbol is sent across long interconnection medium 41. At a sampling time 165 the handshake signal is low, so a control symbol is sent across long interconnection medium 41. At a sampling time 166 the handshake signal is high, so a data symbol is sent across long interconnection medium 41. At a sampling time 167 the handshake signal is low, so a control symbol is sent across long interconnection medium 41. At a sampling time 168 the handshake signal is high, so a data symbol is sent across long interconnection medium 41. At a sampling time 169 the handshake signal is low, so a control symbol is sent across long interconnection medium 41. At a sampling time 170 the handshake signal is high, so a data symbol is sent across long interconnection medium 41. And so on.

At a sampling time 163, the handshake signal is at a transition 152. Therefore, it is uncertain whether a data symbol or a control symbol will be transmitted. However, since the sampling frequency is greater than the handshake transition rate, the transfer of either a data symbol or a control symbol at transition 152 will not effect the accuracy of the reconstruction of the handshake signal. Sampling of handshake transition 152 only generates a redundant sampling of C or D.

Figure 7:
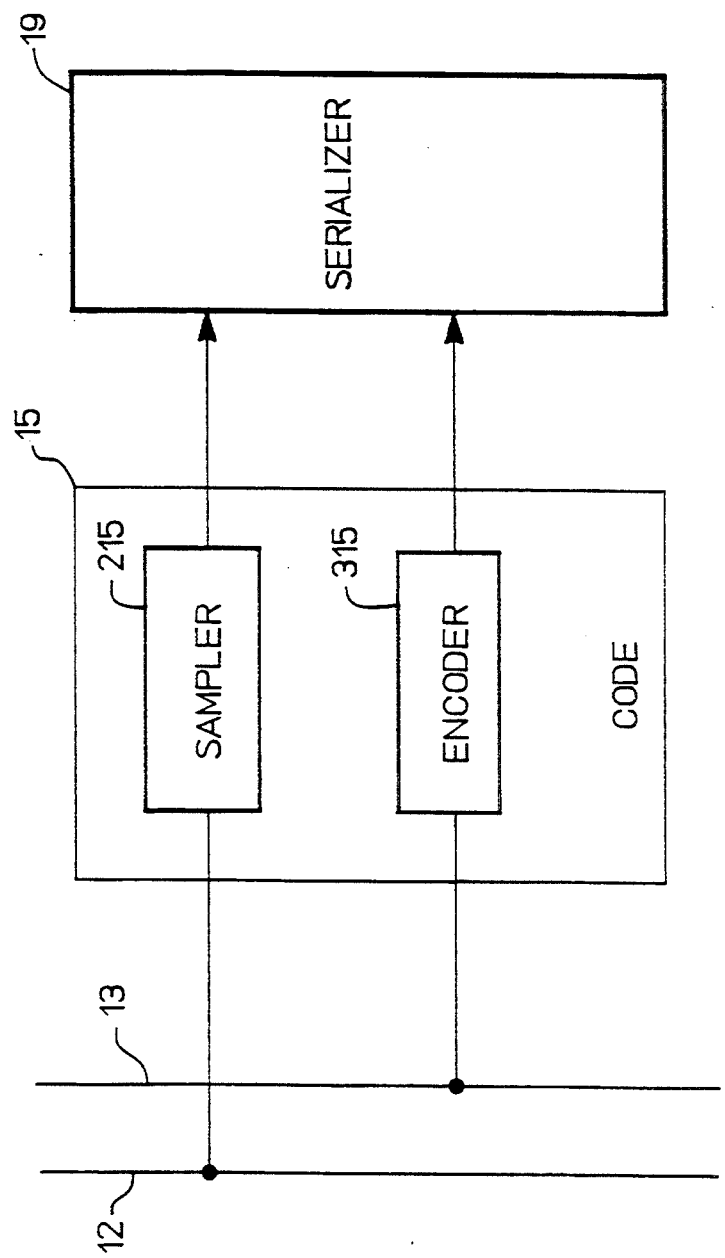
FIG. 7 is a block diagram which shows additional detail of a coder shown in FIG. 2 in accordance with the preferred embodiment of the present invention.

As shown in FIG. 7, the sampling of a handshake signal on network bus segment 10 may be done, for example, by a sampler 215 within coder 15. Sampler 215 samples a handshake signal on one of timing lines 12. Coder 15 is also shown to include an encoder 315 which encodes control signals on control lines 13. For example, sampler 215 is a single flip-flop.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. In a computing system having a parallel bus network in which a first parallel bus network segment is connected to a second parallel bus network segment by an interconnection medium, a method comprising the steps of:
   (a) encoding control signals, appearing on the first parallel bus network, as control symbols;
   (b) encoding data signals, appearing on the first parallel bus network, as data symbols;
   (c) sending the control symbols and the data symbols in a data transmission from the first parallel bus network segment to the second parallel bus network segment across the interconnection medium during a data transaction; and,
   (d) encoding in the data transmission a handshake signal generated on the first parallel bus network segment and used in the data transaction, including the substeps of:
   (d.1) sampling the handshake signal;
   (d.2) when the handshake signal is at a first signal level, sending a control symbol of encoded control signals across the interconnection medium from the first parallel bus network segment to the second parallel bus network segment; and,
   (d.3) when the handshake signal is at a second signal level, sending a data symbol of encoded data signals across the interconnection medium from the first parallel bus network segment to the second parallel bus network segment.

2. The method as in claim 1 wherein the parallel bus network operates according to the SCSI protocol.

3. The method as in claim 1 wherein symbol bits are sent across the interconnection medium at a fixed clock frequency.

4. The method as in claim 1 wherein
   the interconnection medium is a serial transmission medium, and
   step (c) includes sending the data symbols and the control symbols across the serial transmission medium.

5. The method as in claim 2 wherein the first parallel bus network segment operates according to the SCSI protocol, the second parallel bus network segment operates according to the SCSI protocol and the interconnection medium is a serial transmission medium.

6. In a computing system having a parallel bus network in which a first parallel bus network segment is connected to a second parallel bus network segment by an interconnection medium, the parallel bus network having control signals and data signals which are encoded respectively as control symbols and data symbols, the control symbols and the data symbols being sent across the interconnection medium from the first parallel bus network segment to the second parallel bus network segment during a data transaction, a method for transferring a handshake signal from the first parallel bus network segment to the second parallel bus network segment, the method comprising the steps of:
   (a) sampling the handshake signal on the first parallel bus network segment;
   (b) when the handshake signal on the first parallel bus network segment is at a first signal level, sending a control symbol of encoded control signals across the interconnection medium from the first parallel bus network segment to the second parallel bus network segment;
   (c) when the handshake signal on the first parallel bus network segment is at a second signal level, sending a data symbol of encoded data signals across the interconnection medium from the first parallel bus network segment to the second parallel bus network segment; and,
   (d) when receiving the symbols sent in steps (b) and (c) by the first second segment from across the interconnection medium, reconstructing the first handshake signal by holding a reconstructed handshake signal on the second parallel bus network segment at the first signal level while control symbols of encoded control signals are being received by the second parallel bus network segment and holding the reconstructed handshake signal on the second parallel bus network segment at the second signal level while data symbols of encoded data signals are being received by the second parallel bus network segment.

7. The method as in claim 6 wherein the parallel bus network operates according to the SCSI protocol.

8. The method as in claim 7 wherein the first parallel bus network segment operates according to the SCSI protocol, the second parallel bus network segment operates according to the SCSI protocol and the interconnection medium is a serial transmission medium.

9. The method as in claim 6 wherein symbol bits are sent across the interconnection medium at a fixed clock frequency.

10. The method as in claim 6 wherein
the interconnection medium is a serial transmission medium,
step (b) includes sending the control symbol of encoded control signals across the serial transmission medium, and
step (c) includes sending the data symbol of encoded data signals across the serial transmission medium.

11. A computing system having a parallel bus network, the parallel bus network comprising:
a first parallel bus network segment comprising first control lines on which are placed control signals, first data lines on which are placed data signals and a first handshake line on which is placed a handshake signal used in data transactions;
a second parallel bus network segment comprising second control lines on which are placed the control signals, second data lines on which are placed the data signals and a second handshake line on which is placed the handshake signal used in data transactions;
an interconnection medium between the first parallel bus network segment and the second parallel bus network segment;
sampling means, connected to the first handshake line, for sampling the handshake signal on the first handshake line;
encoding means, connected to the first control lines and the first data lines, for encoding the control signals on the first control lines into control symbols and for encoding the data signals on the first data lines into data symbols;
transmission means, coupled to the sampling means, the encoding means and the interconnection medium, for sending a control symbol of encoded control signals across the interconnection medium when the handshake signal on the first handshake line is at a first signal level, and for sending a data symbol of encoded data signals across the interconnection medium when the handshake signal on the first handshake line is at a second signal level; and,
receiving means, coupled to the interconnection medium and to the second handshake line, the second data lines and the second control lines, for receiving symbols sent across the interconnection medium, and for holding the handshake signal on the second handshake line at the first signal level when control symbols are being received and for holding the handshake signal on the second handshake line at the second signal level when data symbols are being received.

12. The method as in claim 11 wherein the parallel bus network operates according to the SCSI protocol.

13. The method as in claim 12 wherein symbol bits are sent across the interconnection medium at a fixed clock frequency.

14. The computing system as in claim 12 wherein the first parallel bus network segment operates according to the SCSI protocol, the second parallel bus network segment operates according to the SCSI protocol and the interconnection medium is a serial transmission medium.

15. The method as in claim 14 wherein the serial transmission medium comprises an optical medium.

16. The computing system as in claim 11 wherein the interconnection medium is a serial transmission medium.

17. The method as in claim 16 wherein the serial transmission medium comprises a radio frequency signal.

18. The method as in claim 16 wherein the serial transmission medium comprises an optical medium.

19. The method as in claim 16 wherein the serial transmission medium comprises a twisted wire pair.

20. The method as in claim 16 wherein the serial transmission medium comprises coaxial cable.

* * * * *